United States Patent [19]
Ukita

[11] Patent Number: 5,905,360
[45] Date of Patent: May 18, 1999

[54] BATTERY SYSTEM AND ELECTRIC MOTOR VEHICLE USING THE BATTERY SYSTEM WITH CHARGE EQUALIZING FEATURES

[75] Inventor: Susumu Ukita, Nagoya, Japan

[73] Assignee: Toyota Jidosha Kabushiki Kaisha, Toyota, Japan

[21] Appl. No.: 08/915,595

[22] Filed: Aug. 21, 1997

[30]      Foreign Application Priority Data

Aug. 22, 1996  [JP]  Japan .................................... 8-221420

[51] Int. Cl.⁶ ................................................. H01M 10/46
[52] U.S. Cl. ........................................... 320/118; 320/121
[58] Field of Search ..................................... 320/103, 104, 320/116, 118, 121, 122, 134, 136, 162, FOR 105, FOR 116, FOR 138, FOR 142

[56]          References Cited

U.S. PATENT DOCUMENTS

| | | | |
|---|---|---|---|
| 5,444,354 | 8/1995 | Takahashi et al. | 320/162 X |
| 5,592,067 | 1/1997 | Peter et al. | 320/103 |
| 5,598,088 | 1/1997 | Richter | 320/134 |

FOREIGN PATENT DOCUMENTS 5-137269  6/1993  Japan .
5-199609  8/1993  Japan .
7-95703   4/1995  Japan .

*Primary Examiner*—Edward H. Tso
*Attorney, Agent, or Firm*—Oblon, Spivak, McClelland, Maier & Neustadt, P.C.

[57]          ABSTRACT

In an electric motor vehicle, a bidirectional boosting converter is placed in a battery circuit. A main contactor is turned off to disconnect one battery block from another and contactors are turned on to connect a first battery block to one terminal pair of the bidirectional boosting converter and to connect a second battery block to another terminal pair of the bidirectional boosting converter. A refreshing discharge of the first battery block or an equalizing charge of the second battery block is performed by boosting output of the first battery block and using this output to charge the second battery block. The boosting direction of the bidirectional boosting converter is changed to perform an equalizing charge of the first battery block or a refreshing discharge of the second battery block. The boosting direction is changed again to balance battery block SOCs, these by eliminating need for a charging device for equalizing charge or a discharging device for refreshing discharge.

18 Claims, 12 Drawing Sheets

A, B : BATTERY BLOCK
$S_M$, $S_1$, $S_2$ : CONTACTOR
a ~ b: TERMINAL
46, 48 : CURRENT SENSOR
50, 52 : VOLTAGE SENSOR
54, 56 : TEMPERATURE SENSOR

▨ : SOC VALUE

BATTERY SYSTEM AND ELECTRIC MOTOR VEHICLE USING THE BATTERY SYSTEM WITH CHARGE EQUALIZING FEATURES

BACKGROUND OF THE INVENTION

1. Field of the Invention

This invention relates to an electric motor vehicle, such as an electrical locomotive or an electric vehicle (EV), equipped with batteries and a vehicle propelling motor-generator.

2. Description on the Related Art

Propelling an electric motor vehicle with a vehicle propelling motor requires an electric power source which can supply sufficient driving power to the motor. A pure EV uses a secondary battery, sometimes a lead battery, as an electric power source. Furthermore, a so-called hybrid vehicle may use, together with a secondary battery, a secondary electric power source, such as an engine-driven-generator, a solar cell, or a fuel cell (Japanese Patent Laid-Open Publication No. Hei 5-199609). In any case, a relatively high power-supply voltage of, for example, DC 250 V is generally required to drive a high output vehicle propelling motor. In order to achieve such a high voltage, batteries connected in series can be used.

To use these batteries connected in series as the secondary battery, operations such as an equalizing charge and a refreshing discharge are necessary to prevent an unequal status (that is, unequal electrode status or unequal electromotive forces), which shorten battery life, between these batteries. The equalizing charge stated above is known as an operation in which serially-connected batteries are charged to a slightly excessive charging level; the refreshing discharge is an operation in which almost all electricity is discharged from serially-connected batteries. Both operations equalize battery electrode states by introducing extremely high or low state of charge (SOC). In connection with an equalizing charge or a refreshing discharge, conventional electric motor vehicles have a problem that a manual connecting operation of a charger or a discharger to the secondary battery is required.

This problem is especially serious for hybrid vehicles. Hybrid vehicles can be classified into series hybrid vehicles, parallel hybrid vehicles, or their combinations or variations. A series hybrid vehicle can charge its secondary battery by electric output from other on-board electric power sources such as an engine-driven-generator; a parallel hybrid vehicle can charge its secondary battery by electric output from a generator coupling an engine and driving wheels. That is, since the various types of hybrid vehicles can charge secondary batteries with on-board components, exclusive apparatuses such as a charger and a discharger and manual operations thereof are not necessary to propel these vehicles.

Nevertheless, because equalizing charge and refreshing discharge are necessary, hybrid vehicles must be equipped with a charger and a discharger and must be used in the environment in which the infrastructure such as charging and discharging facilities are available along roads or in garages. Since the equalizing charge and the refreshing discharge are not performed frequently, this equipment and the infrastructure is very expensive. Therefore, in addition to the above troublesome operations, there exists a problem of high implementation costs such as building cost of charging and discharging facilities etc. and necessity to provide infrastructures including a number of garages with charging and discharging facilities etc.

SUMMARY OF THE INVENTION

The first object of the present invention is to free users from the manual charge-and-discharge operations for equalizing charge and refreshing discharge by removing the necessity for installing large-sized devices on the vehicle or preparing facilities for equalizing charge and refreshing discharge, based on the newly introduced battery peripheral circuits and its control sequence in an electric motor vehicle. The second object of the present invention is to eliminate barriers to the spread of hybrid vehicles by achieving the above first object especially with hybrid vehicles, specifically, by reducing implementation costs and releasing the vehicle from the limitations of a large-scale infrastructure. The third object of the present invention is to make it possible, by applying improved battery peripheral circuits according to the present invention, to the purpose of balancing battery SOCs, to propel the vehicle with the batteries the SOCs of which are substantially and accurately balanced with each other. The fourth object of the present invention is to prevent the vehicle-starting with significantly unequal electrode status between batteries due to interrupted equalizing change or the refreshing discharge, by considering a user's intention on the execution of an equalizing charge or a refreshing discharge for the charging/discharging management sequence. The fifth object of the present invention is to shorten the time necessary for an equalizing charge and a refreshing discharge and to quickly eliminate SOC unbalance between batteries immediately after vehicle starting, by linking the battery SOC management sequence to the battery charging/discharging control sequence.

An electric motor vehicle to which the present invention is applied has, for example, a battery block set and a vehicle propelling motor-generator. The battery block set includes battery blocks each having an electromotive force, and the vehicle propelling motor-generator is utilized for supplying electric power to the series connection of these battery blocks and receiving electric power therefrom. In other words, in the electric motor vehicle, batteries are divided into a plurality of groups, i.e. the battery blocks each having a electromotive force. At the time of traveling, these battery blocks are connected in series to supply sufficient voltage to the vehicle propelling motor-generator and receive electric power therefrom. In a preferred embodiment of the present invention, a determination of whether or not a predetermined equalizing charge (or refreshing discharge) executing condition concerning the above battery block set is met is made. If the executing condition is met, forced charge transfer from battery block to battery block is performed for each of the above battery blocks, when there is no need for supplying and receiving electric power between the battery blocks and the vehicle propelling motor-generator. An equalizing charge (or refreshing discharge) is performed for each battery block by setting a predetermined equalized SOC (or refreshed SOC) as the control target.

"Forced charge transfer between battery blocks" stated above means, for example, an operation where discharge power of one battery block is boosted and another battery block is forcedly charged with the boosted discharged power, namely an operation to intentionally cause extreme SOC unbalance without power supplying to and receiving from an external circuit. Also, the "executing condition" is, for example, an excess of the voltage unbalance between batteries or between battery blocks over a predetermined level, or an excess of elapsed time after the last equalizing charge or refreshing discharge over predetermined time. "An equalized SOC" and "a refreshed SOC" have, for example, a value slightly greater than 100% and a value close to 0%, respectively.

As stated above, an equalizing charge or a refreshing discharge is achieved by forced charge transfer between battery blocks, without supplying electric power to or receiving from external apparatus or facility. In this embodiment, therefore, there is no need to fit a vehicle large-sized devices or to build facilities for equalizing charge and refreshing discharge outside the vehicle. This frees users from the manual operation to perform equalizing charge and refreshing discharge, resulting in improved usability. Furthermore, since only relatively compact and low-cost components such as a booster and a contactor are required in stead of conventional charging or discharging devices or facilities, no new demands on infrastructure are introduced and no significant increase in cost occurs.

As apparent from the definition, the equalizing charge and the refreshing charge are operations to equalize electrode status by intentionally introducing extremely high and low SOCs, respectively. In the present invention, since one battery block is utilized to perform the equalizing charge (or the refreshing discharge, of other battery block, the equalizing charge (or the refreshing discharge) results SOC unbalance between battery blocks each other. In a further preferable embodiment of the present invention, after an equalizing charge (or refreshing discharge) is finished for every battery block, the SOC unbalance result from the equalizing charge (or refreshing discharge) is eliminated by sequentially performing forced charge transfer from battery block to battery block for each of the above battery blocks to fill up the shortage in one battery block using the charge from an other battery block. Also in a still preferable embodiment of the present invention, while the vehicle is traveling, a significant difference of SOCs between the battery blocks is eliminated by sequentially performing forced charge transfer from battery block to battery block for each of the above battery blocks in the same manner as the case just after the equalizing change or refreshing discharge, when the necessity for supplying and receiving of electric power between the battery blocks and the vehicle propelling motor-generator is removed, or when there occurs a chance to temporary stop supplying and receiving of electric power between the battery blocks and the vehicle propelling motor-generator. In these embodiments, balance of SOCs between the battery blocks is achieved with the circuits and devices for forced charge transfer used for equalizing charge or refreshing discharge as previously described. Therefore, problems arising from SOC unbalance between the battery blocks are avoidable without the addition of special circuits or devices or an increase in the implementation costs. For example, the occurrence of excessive charge (including that caused by regeneration or, in a hybrid vehicle, electric power from other electric power sources) and excessive discharge at the time of traveling and thus shortening the lives of the batteries can be avoided.

In addition, by performing an operation for eliminating the SOC unbalance just after an equalizing charge or a refreshing discharge, in most cases the vehicle can start traveling with substantially balanced SOCs even though the equalizing charge or refreshing discharge by forced charge transfer from battery block to battery block i.e. an operation to intentionally cause the SOC unbalance has been performed. However, when an equalizing charge or a refreshing discharge by forced charge transfer from battery block to battery block or an operation for eliminating SOC unbalance by forced charge transfer from battery block to battery block is interrupted for some reason at the time of starting, there still exists SOC unbalance between the battery blocks which cannot be neglected to maintain the lives of the batteries. In order to meet this problem, in a further preferred embodiment, an operation for eliminating SOC unbalance between the battery blocks is performed when the necessity for supplying and receiving of electric power between the battery blocks and the vehicle propelling motor-generator is removed (for example, when a driver turns off an ignition key) or when there occurs a chance for a temporary stoppage of supplying electric power from the battery blocks to the vehicle propelling motor-generator or vice versa (for example, when a shift lever is brought into a neutral or parking position). If a forced charge transfer from battery block to battery block is performed in such a case, a significant difference of SOCs between the battery blocks at the time of starting will be quickly eliminated without a hindrance to traveling.

In a still preferable embodiment of the present invention, prior to the execution of an equalizing charge (or refreshing discharge), the time necessary for the execution is notified to a vehicle driver for the permission therefor. If the permission is obtained from the driver, an equalizing charge (or refreshing discharge) is performed; if the permission is not obtained, an equalizing charge (or refreshing discharge) is prohibited. Therefore, since the execution of an equalizing charge or a refreshing discharge can be permitted or prohibited according to the driver's intention about the execution of an equalizing charge or a refreshing discharge, the circumstances in which an equalizing charge or a refreshing discharge is performed in spite of a short stop and thus, at the time of restarting, a significant difference of SOCs between the battery blocks newly arises and the unequal electrode status remains may not occur. This leads to excessive charge and excessive discharge of the batteries and hence shortened battery life.

In a still preferable embodiment of the present invention, output of a variable output electric power source is provided to the series connection of the battery blocks. When it is necessary to supply electric power from the battery blocks to the vehicle propelling motor-generator vice versa, output of the variable output electric power source is controlled so that an SOC of the above serially-connected battery blocks is always within a target range. And, when the output of the variable output electric power source is controlled and the executing condition of equalizing charge (or refreshing discharge) is met, a target range of an SOC for the serially connected battery blocks is set close to an equalized SOC (or refreshed SOC). In a still further preferable embodiment of the present invention, when there exists a significant difference of SOCs between the above battery blocks, a minute range including an average SOC of these battery blocks is set as the target SOC range.

These embodiments are examples of the application of the present invention to a hybrid vehicle, especially a type in which batteries are charged by output of an on-board variable output electric power source. With a hybrid vehicle to which the present invention applies as in these embodiments, there is no need to provide charging or discharging devices or facilities. This reduces implementation costs and raises limitations on available space, eliminating barriers to the spread of hybrid vehicles. In these embodiments, moreover, an SOC of the whole of the battery blocks connected in series is managed by controlling output of the variable output electric power source (for example, engine-driven-generator) so that an SOC is always within a target range. In these embodiments, the management of an SOC is linked to control of charge-and-discharge of the batteries.

The first method of linking is as follows: when executing conditions of equalizing charge or refreshing discharge are met, an SOC of the whole of the battery blocks connected in series is managed so that it is always within a range different from a normal target range. That is, a target range of an SOC at the time of traveling is set to a range relatively close to an equalized SOC (namely, target of an SOC at the time of equalizing charge) when an equalizing charge is necessary; and, conversely, to a range relatively close to a refreshed SOC (namely, target of an SOC at the time of refreshing discharge) when a refreshing discharge is necessary. By linking the management of SOCs of the batteries to control of charge-and-discharge of the batteries, as stated above, the time necessary for an equalizing charge or a refreshing discharge is shortened.

The second method of linking is as follows: when there exists a significant difference of SOCs between the battery blocks, a target range of an SOC is limited to a very narrow one so that excessive charge of a battery block in a high SOC or excessive discharge of a battery block in a low SOC may not occur. As a result, even if there has existed a significant difference of SOCs between the battery blocks at the time of starting or at one point during traveling time, damage to the batteries resulting from excessive charge or excessive discharge of each battery block is avoidable. In addition, by combining the second method with the embodiment in which forced charge transfer is performed when the necessity for supplying and receiving of electric power between the battery blocks and the vehicle propelling motor-generator is removed or when there is chance for a temporary stoppage of supplying and receiving of electric power between the battery blocks and the vehicle propelling motor-generator, unbalance resulting from an interruption of an equalizing charge etc. can be quickly eliminated by the SOC management at the time of traveling or a charge transfer operation at the time of neutral.

DETAILED DESCRIPTION ON THE EMBODIMENTS

Based on the drawings, preferred embodiments of the present invention will be described below.

(1) System configuration

Figure 1:
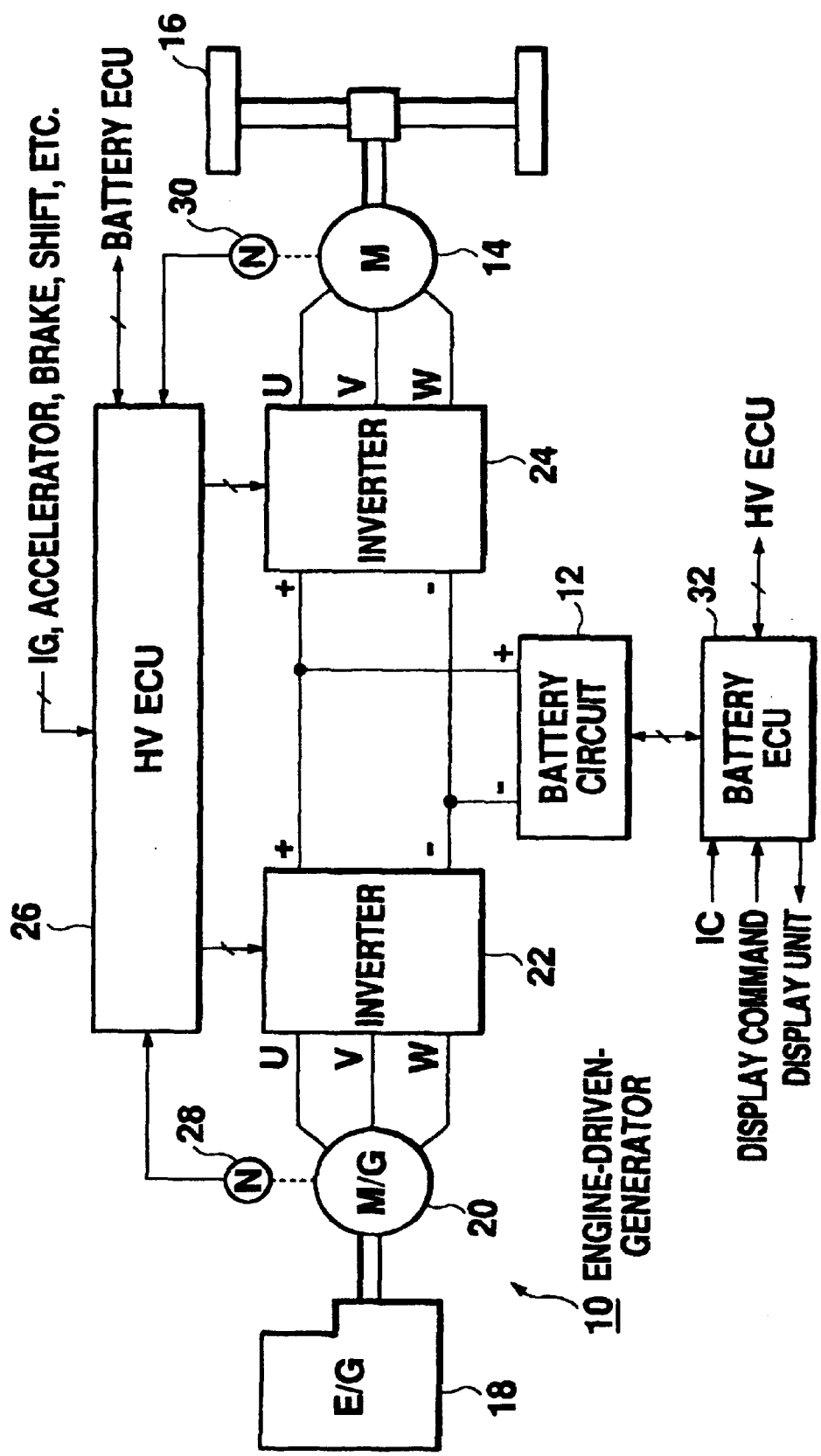
FIG. 1 is a block diagram showing an entire system configuration of an electric motor vehicle according to one embodiment of the present invention.

FIG. 1 shows an entire system of an electric motor vehicle configured as a series hybrid vehicle according to one embodiment of the present invention. The vehicle in FIG. 1 has a system configuration in which a motor 14 is driven by electric power obtained from an engine-driven-generator 10 and a battery circuit 12 and output torque of the motor 14 is provided to driving wheels 16. The engine-driven-generator 10 has an engine 18 and a motor-generator 20, the axes of which are mechanically connected to each other. The motor-generator 20 can be used as either a generator driven by the engine 18 or a motor appending torque to the engine 18. For the purpose of maintaining efficiency etc., three-phase alternating current machines are used as the motor-generator 20 and the vehicle propelling motor 14. In order to connect the motor-generator 20 and the motor 14 to the battery circuit 12, which is a direct-current power source, and to make their output torque etc. controllable, inverters 22, 24 are placed between the motor-generator 20 and the battery circuit 12 and between the battery circuit 12 and the motor 14 respectively.

In this system configuration, therefore, discharged output of the battery circuit 12 can be converted to a three-phase alternating current by the inverter 24 to drive the motor 14 and braking energy regenerated by the motor 14 can be converted to a direct current by the inverter 24 to provide it to the battery circuit 12, as in a pure EV. Furthermore, electric power obtained by operating the engine 18 and using the motor-generator 20 as a generator can be converted to a direct current by the inverter 22 and then converted back to a three-phase alternating current by the inverter 24 so that it may be provided to the motor 14. Therefore, a vehicle can be propelled without charge-and-discharge of the battery circuit 12 (namely, without variations of SOCs of batteries in the battery circuit 12). Generated output of the motor-generator 20 (strictly speaking, direct-current output of the inverter 22) can also be used to charge the batteries in the battery circuit 12. In addition, converting discharged output of the battery circuit 12 to a three-phase alternating current by the inverter 22 and operating the motor-generator 20 as a motor by the obtained electric power starts the engine 18.

In this embodiment, two types of control devices called an electronic controlling unit (ECU) are used for controlling these components. An HVECU 26 of the two has a function to control output etc. of the motor 14 and the engine 18 at least while an ignition switch (IG) is on. That is, by controlling a switching operation of the inverter 22, the HVECU 26 drives the motor 14 and causes the motor-generator 20 to generate electric power necessary to maintain SOCs of the batteries in the battery circuit 12 within a target range, and causes the motor-generator 20 to output torque necessary to start the engine 18. By controlling a switching operation of the inverter 24, the HVECU 26 also causes the motor 14 to output torque corresponding to the operation of an accelerator pedal, a brake pedal, a shift lever, etc. In order to control the inverters 22, 24 and to maintain a rotation frequency of the engine 18 within a predetermined high-efficiency region, the HVECU 26 detects and references rotor angular positions or motor rotation of the motor 14 and the motor-generator 20 with respective rotation sensors 28, 30. The HVECU 26 performs such control with signals supplied to and received from a battery ECU 32. The battery ECU 32 detects charging and discharging currents, voltage, temperature, etc. of the batteries in the battery circuit 12, examines their SOCs, provides necessary information to the HVECU 26, and causes a display unit to display it, while the IG is on, and for a time after the IG is turned off.

Figure 2:
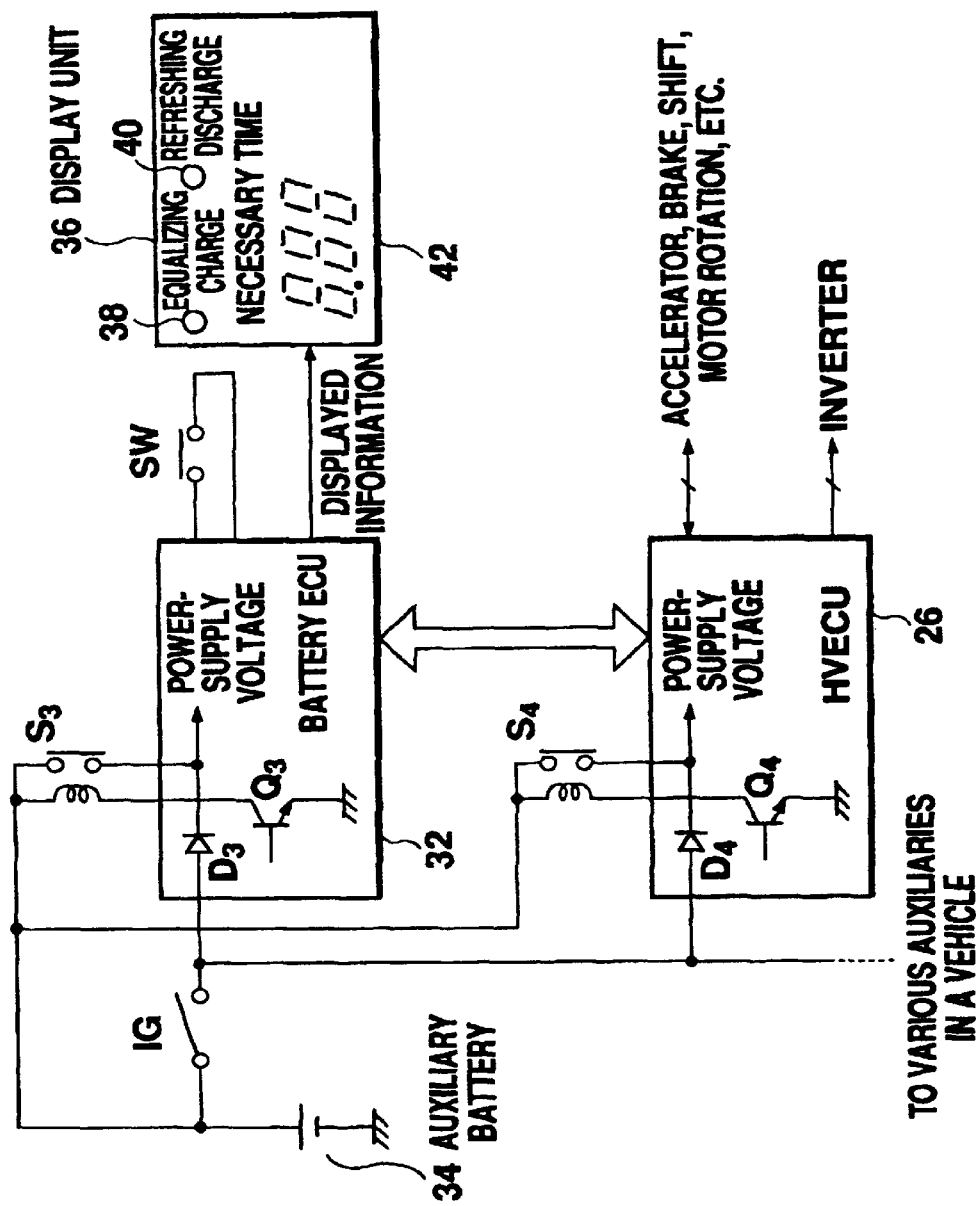
FIG. 2 is a block diagram showing an arrangement of peripheral circuits of an HVECU and a battery ECU in this embodiment.

FIG. 2 shows a more detailed configuration of peripheral circuits of the HVECU 26 and the battery ECU 32. A component shown by numeral 34 in FIG. 2 is an auxiliary battery providing driving electric power to on-board electrical appliances driven by relatively weak electric power. The HVECU 26 and the battery ECU 32 are also provided with its driving power from the auxiliary battery 34 and the ignition switch IG operated by a driver and a diode D3 or D4 for regulating a current direction on electric power supply paths from the auxiliary battery 34 to the HVECU 26 and the battery ECU 32 are provided. When the IG is turned on, the supply of electric power to the HVECU 26 and the battery ECU 32 begins; when the IG is turned off, the supply is shut off. However, self exciting contactors S3, S4 for maintaining the supply of electric power are connected to the HVECU 26 and the battery ECU 32 respectively and exciting coils in the contactors S3, S4 are driven by a transistor Q3 in the battery ECU 32 and a transistor Q4 in the HVECU 26, respectively. Therefore, by previously turning on their internal transistors Q3, Q4 and conducting an electric current to the corresponding respective contactors S3, S4, the battery ECU 32 and the IWECU 26 can still obtain electric power, even after the IG is turned off.

Furthermore, a display unit 36 and a switch SW are connected to the battery ECU 32. The display unit 36 notifies a vehicle driver etc. of the necessity for equalizing charge/refreshing discharge and its necessary time. Specifically when the battery ECU 32 judges that an equalizing charge is necessary, it causes an equalizing charge display part 38 on the display unit 36 to light, for example, after the IG is turned off. When the battery ECU 32 judges that a refreshing discharge is necessary, it causes a refreshing discharge display part 40 on the display unit 36 to light, for example, after the IG is turned off. In both cases, it causes a time display part 42 on the display unit 36 to display the necessary time. The driver etc. compares the necessary time displayed on the time display part 42 and the expected stoppage time etc. and commands to the battery ECU 32, by operating the switch SW, to begin an equalizing charge or a refreshing discharge if he judges that "during the stoppage time (while the IG is off), an equalizing charge or a refreshing discharge can be finished."

Figure 3:
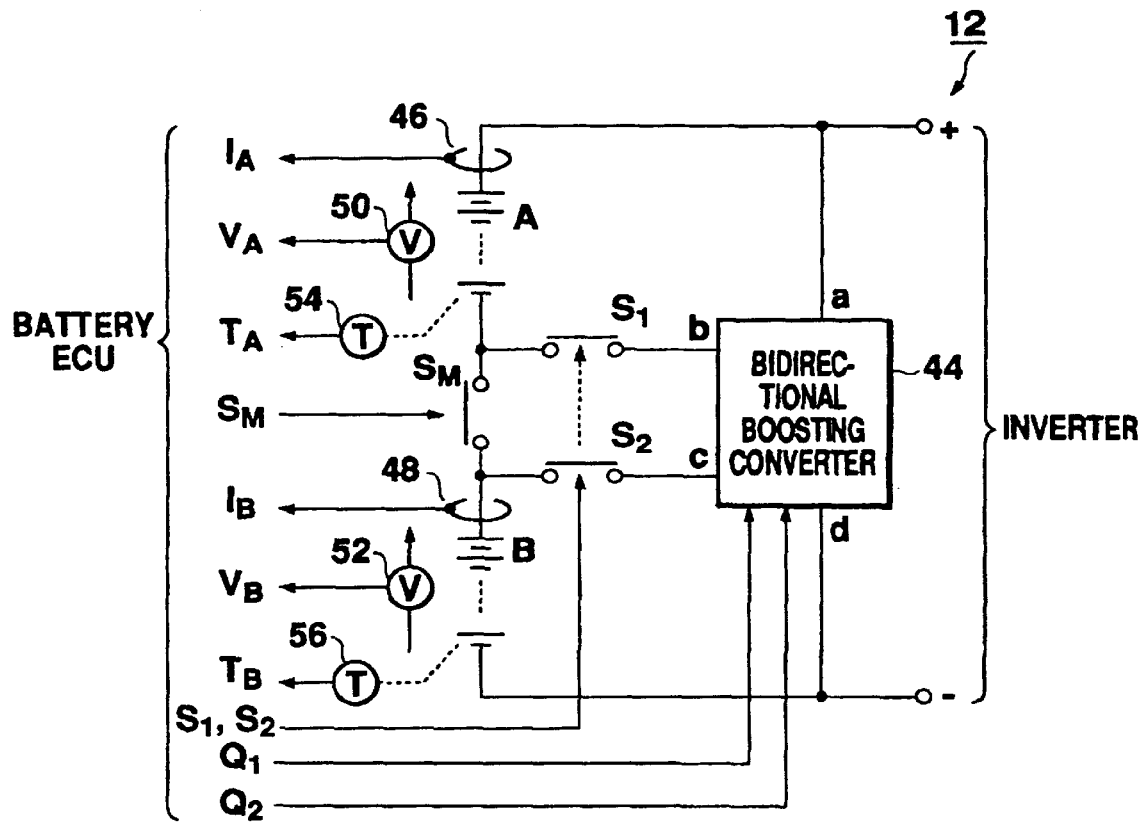
FIG. 3 is a circuit diagram showing an internal connection of a battery circuit in this embodiment.

FIG. 3 shows an internal connection of the battery circuit 12. Many batteries, such as a lead battery and a nickel-metallized hydrogen battery, are provided in the battery circuit 12 and all these batteries belong to one of two battery blocks A, B and in each of battery blocks A, B the batteries are connected in series. There is a contactor SM between the battery block A and B (between the negative terminal of the battery block A and the positive terminal of the battery block B in FIG. 3) and the contactor SM is usually held in an ON state. When the contactor SM is on, two other contactors S1, S2 are held in an OFF state. Therefore, the battery blocks A and B are usually connected in series, that is, all the batteries are connected in series. The battery blocks A, B connected in series are connected between direct-current terminals of the inverters 22, 24.

Figure 4:
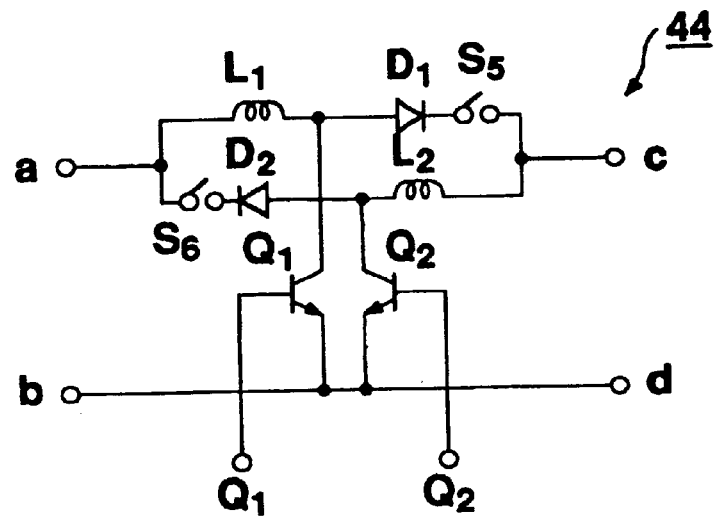
FIG. 4 is a circuit diagram showing an internal of a bidirectional boosting converter in this embodiment.

A bidirectional boosting converter 44 is also provided in the battery circuit 12. As shown in FIG. 4, the bidirectional boosting converter 44 has a diode D1 for regulating a current direction to conduct an electric current from a terminal a to a terminal c, a transistor Q1 for turning on/off voltage applied to an anode of the diode D1, a reactor L1 for accumulating energy based on this switching action, and a contactor (or semi-conductor switch) S5 turned on at the time of boosting in the direction of ab→cd and turned off at the time of boosting in the direction of cd→ab. When a voltage is applied between the terminals a and b, the voltage is boosted by a switching action of the transistor Q1 and the accumulation of energy in the reactor L1 based on this switching action and the boosted voltage appears between the terminals c and d. As shown in FIG. 3, the terminals a and b are connected to the positive and negative terminals of the battery block A respectively; the terminals c and d are connected to the positive and negative terminals of the battery block B respectively. Therefore, when the contactor SM is off and the contactors S1, S2 between the battery blocks corresponding to the terminals b and c are on, voltage across the battery block A can be boosted and applied to the battery block B by the repetition of a switching action of the transistor Q1, enabling the forced transfer of charges in the batteries belonging to the battery block A to the batteries belonging to the battery block B. The bidirectional boosting converter 44 also has a diode D2, a transistor Q2, a reactor L2, and a contactor SG in order to provide such a function bidirectionally, namely, in order to boost voltage between the terminals c and d and output boosted voltage between the terminals a and b. The contactors S5, S6 prevent an electric current from conducting in a direction opposite the expected boosting direction.

Current sensors 46, 48, voltage sensors 50, 52, and temperature sensors 54, 56 are placed in the battery circuit 12 in order to obtain information necessary for the battery ECU 32 and the HVECU 26. The sensors 46, 48, 50 detect current IA, voltage VA, and temperature TA, respectively, of the battery block A and the sensors 48, 52, 56 detect current IB, voltage VB, and temperature TB, respectively, of the battery block B. Based on information obtained by these sensors, the battery ECU 32 examines an SOC for each of the battery blocks A and B. The battery ECU 32 also controls the contactors SM, S1, S2 and the transistors Q1, Q2. Again, only a weak electric current flows through components constituting the bidirectional boosting converter 44 and thus low-cost components can be used as the contactors S1, S2, Q1 and Q2. Since a large electric current may flow through the contactor SM when providing a driving electric current to the motor 14, a relatively expensive component must be used as the contactor SM. However, providing the contactor SM does not adding a component because a conventional main contactor, which is often arranged at the DC input terminals of inventor, can be used as the contactor SM, simply by changing the component position. Therefore, cost is not increased.

In FIG. 3 the contactor SM is shown as a single contactor. However, in order to avoid or reduce a rush electric current resulting from a charge of a capacitor (not shown) placed between the direct-current terminals of the inverters 22, 24, the contactor SM may include a resistor for limiting a charging electric current, a first contactor connected in series to the resistor, and a second contactor for short-circuiting both ends of the series connection of the first contactor and the resistor after finishing transient phenomena due to charging of the capacitor.

(2) Forced charge transfer between battery blocks

Figure 5:
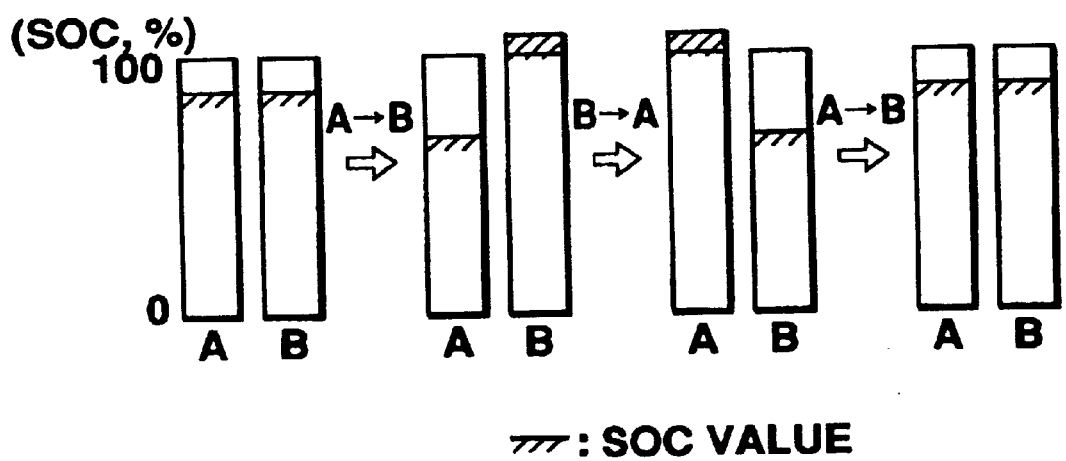
FIG. 5 is a schematic diagram showing the principle of equalizing charge in this embodiment.
Figure 6:
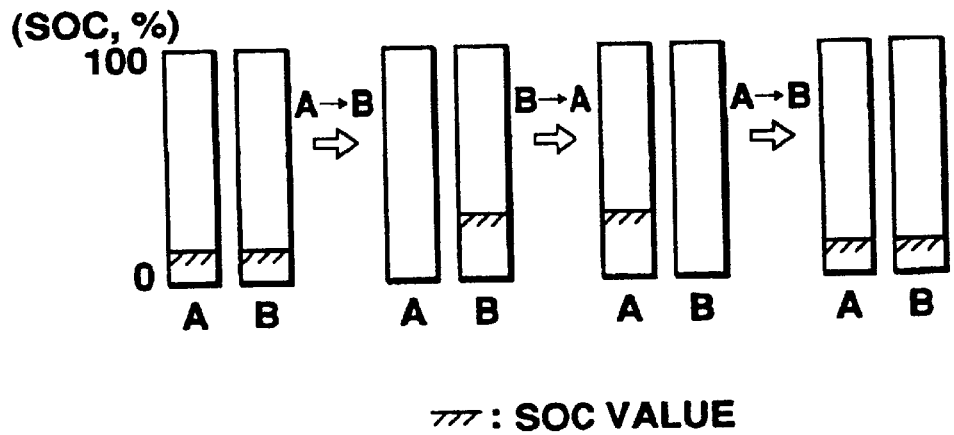
FIG. 6 is a schematic diagram showing the principle of refreshing discharge in this embodiment.

FIG. 5 shows the principle of equalizing charge in this embodiment, and FIG. 6 shows the principle of refreshing discharge in this embodiment. As stated above, one characteristic processing methods of this embodiment is to make equalizing charge and refreshing discharge performable, without an external power source, with the battery circuit 12 divided into the battery blocks A and B and the bidirectional boosting converter 44 therein, after the IG is turned off.

First, when equalizing charge is necessary and its executing condition is satisfied, charges are forcedly transferred from one battery block (for example, A) to the other battery block (for example, B) through the bidirectional boosting converter 44, as shown in FIG. 5 (the first A→B). When an SOC of the battery block B having received charges comes to a predetermined great value (for example, value a little greater than 100%), then charges are forcedly transferred in the opposite direction (B→A in FIG. 5). At the point of time when an SOC of the battery block A having received charges resultingly comes to a predetermined great value, equalizing charge has finished for both of the battery blocks A and B. Similarly, when refreshing discharge is necessary and its executing condition is satisfied, charges are forcedly transferred from the battery block A to the battery block B through the bidirectional boosting converter 44, as shown in FIG. 6. When an SOC of the battery block A comes to a predetermined small value (for example, 0%), charges are forcedly transferred in the opposite direction. At the point of time when an SOC of the battery block B resultingly comes to a predetermined small value, refreshing discharge has finished for both of the battery blocks A and B.

As stated above, alternately performing forced charge transfer between battery blocks offers advantages including that of enabling equalizing charge and refreshing discharge without specially installed charging or discharging equipment.

Figure 7:
FIG. 7 is a schematic diagram showing a SOC unbalance between battery blocks.

Furthermore, forced charge transfer between the battery blocks can be used to cause SOCS of the battery blocks to balance with each other. That is, after an equalizing charge or a refreshing discharge according to the above principle, there occurs unbalance of SOCs between the battery blocks A and B, as shown in FIG. 7. If this unbalance is left as it is, a battery block in a high SOC may come to an excessive charging level and a battery block in a low SOC may come to an excessive discharging level during travel. After an equalizing charge or a refreshing discharge according to the above principle, to eliminate the unbalance, charges are forcedly transferred from the battery block A in a high SOC to the battery block B in a low SOC (hereinafter referred to as "balancing charge-and-discharge") through the bidirectional boosting converter 44 until SOCs of both battery blocks become nearly equal (namely, until a significant difference of SOCs between the two battery blocks disappears), as shown by the second A→Bs in FIGS. 5 and 6. At the point of time when the IG is turned on again after balancing charge-and-discharge are performed, the battery circuit 12 can be used without an unbalance state of SOCs between the battery blocks.

The balancing charge-and-discharge is another feature of the present embodiment, which is newly introduced by the present invention. Furthermore, when equalizing charge or refreshing discharge (or its corresponding balancing charge-and-discharge) shown in FIGS. 5 and 6 is interrupted for some reason (for example, for the reason that the IG is turned on), there occurs SOC unbalance, as shown in FIG. 7. As stated below, this unbalance can be reduced or eliminated by performing balancing charge-and-discharge when a shift lever is placed in a neutral (N) or parking (P) position.

Figure 8:
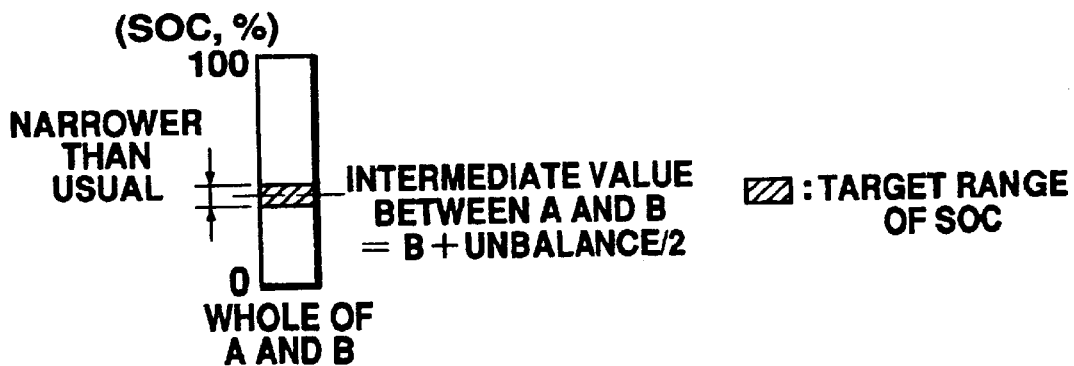
FIG. 8 is a schematic diagram showing restricted target SOC range for eliminating the unbalance.

In this embodiment, moreover, a vehicle has an engine-driven-generator 10, allowing an SOC of the whole of the batteries in the battery circuit 12 connected in series to be managed according to a target range by controlling power generation of the engine-driven-generator 10 through control of the inverter 22. Therefore, by setting a target range of an SOC narrower than normal so that an intermediate value (typically, an average value) between SOCs of the two battery blocks falls within this range, as shown in FIG. 8, when the IG is turned on and there is SOC unbalance, as shown in FIG. 7, damage to the batteries resulting from excessive charge or excessive discharge of the battery blocks A and B can be prevented. This effect is enhanced by using balancing charge-and-discharge with the shift in the N or P position. A normal target range of an SOC is, for example, 20~80% or 30~70%. When there is unbalance of SOCs shown in FIG. 7, a limited target range shown in FIG. 8 is set using the lower limit given by $(xA0+xB0)/2-\epsilon$ and the upper limit given by $(xA0+xB0)/2+\delta$ (where $0<\epsilon<(1-xA0)/2$; $0<\delta<xB0/2$; and xA0, xB0: an SOC of the battery blocks A and B respectively).

Figure 9:
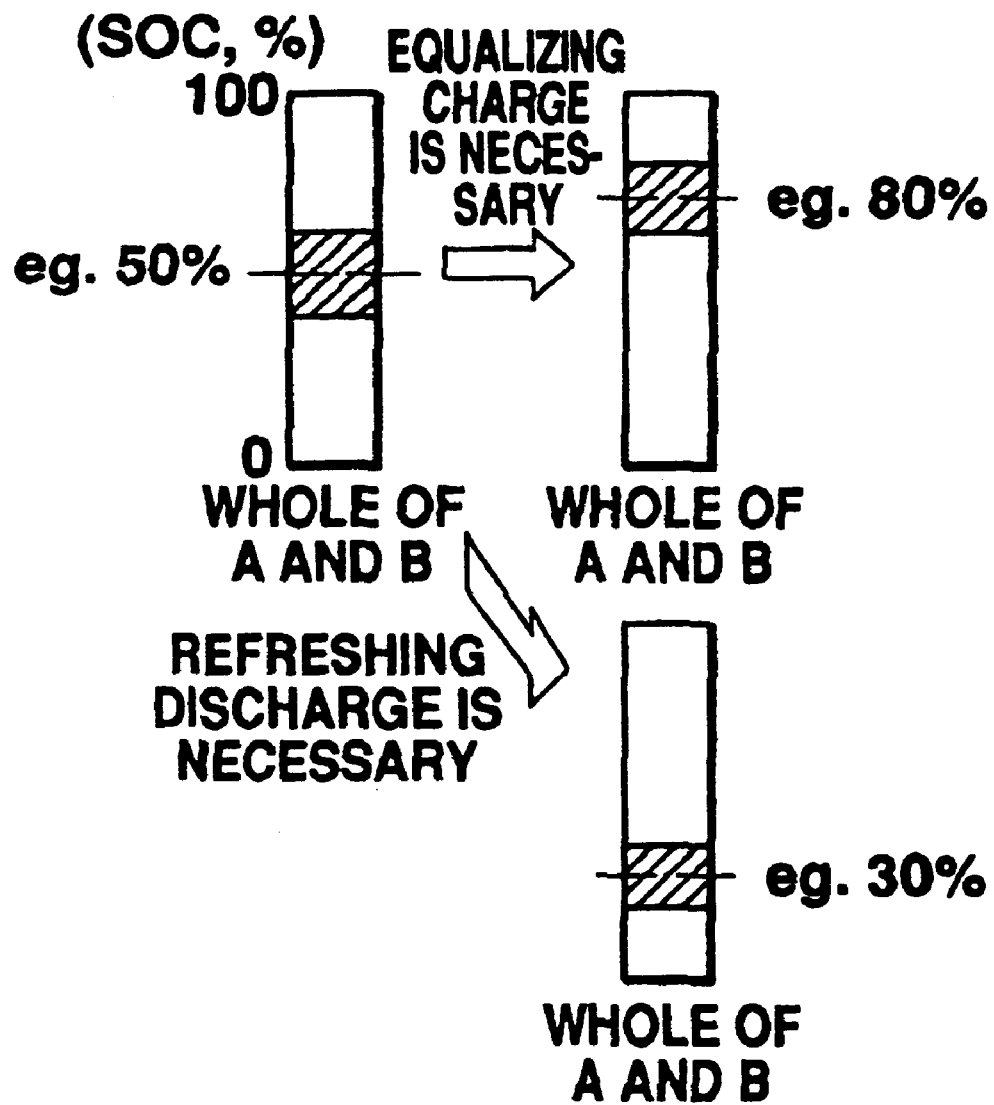
FIG. 9 is a schematic diagram showing a target SOC range shifting when an equalizing charge or a refreshing discharge has become necessary.

As shown in FIG. 9, moreover, if a target range is shifted from a normal range (for example, a range having a center value of 50%) to a higher range (for example, a range having a center value of 80%) when an equalizing charge is necessary and, conversely, if a target range is shifted from a normal range to a lower range (for example, a range having a center value of 30%) when a refreshing discharge is necessary, the circumstances in which "an equalizing charge (or a refreshing discharge) is necessary now, but it cannot be performed because of a too low (high) SOC of batteries" can be prevented from occurring immediately after the IG being turned off. Furthermore, the time necessary for an equalizing charge or a refreshing discharge is shortened, enabling it to be performed even if the IG is turned off for a short time. This produces the effect of being able to surely perform an equalizing charge or a refreshing discharge at an appropriate time. Whether an equalizing charge or a refreshing discharge is necessary or not can be detected by comparing the elapsed time after the last equalizing charge or refreshing discharge or unbalance of the current SOCs or voltage with their thresholds. Whether an equalizing charge or a refreshing discharge is performable or not can be judged by an SOC level. That is, if an SOC is high enough, an equalizing charge is performable; if an SOC is low enough, a refreshing discharge is performable.

In FIGS. 5, 6 and 9, losses occurring at the bidirectional boosting converter 44 and its peripheral components are neglected for convenience of drawing figures. In real situations, equalizing charge and refreshing discharge are only occasionally performed, and so there is only a slight reduction in vehicle efficiency resulting from these losses and it is negligible.

(3) Operations of the ECUs

Figure 10:
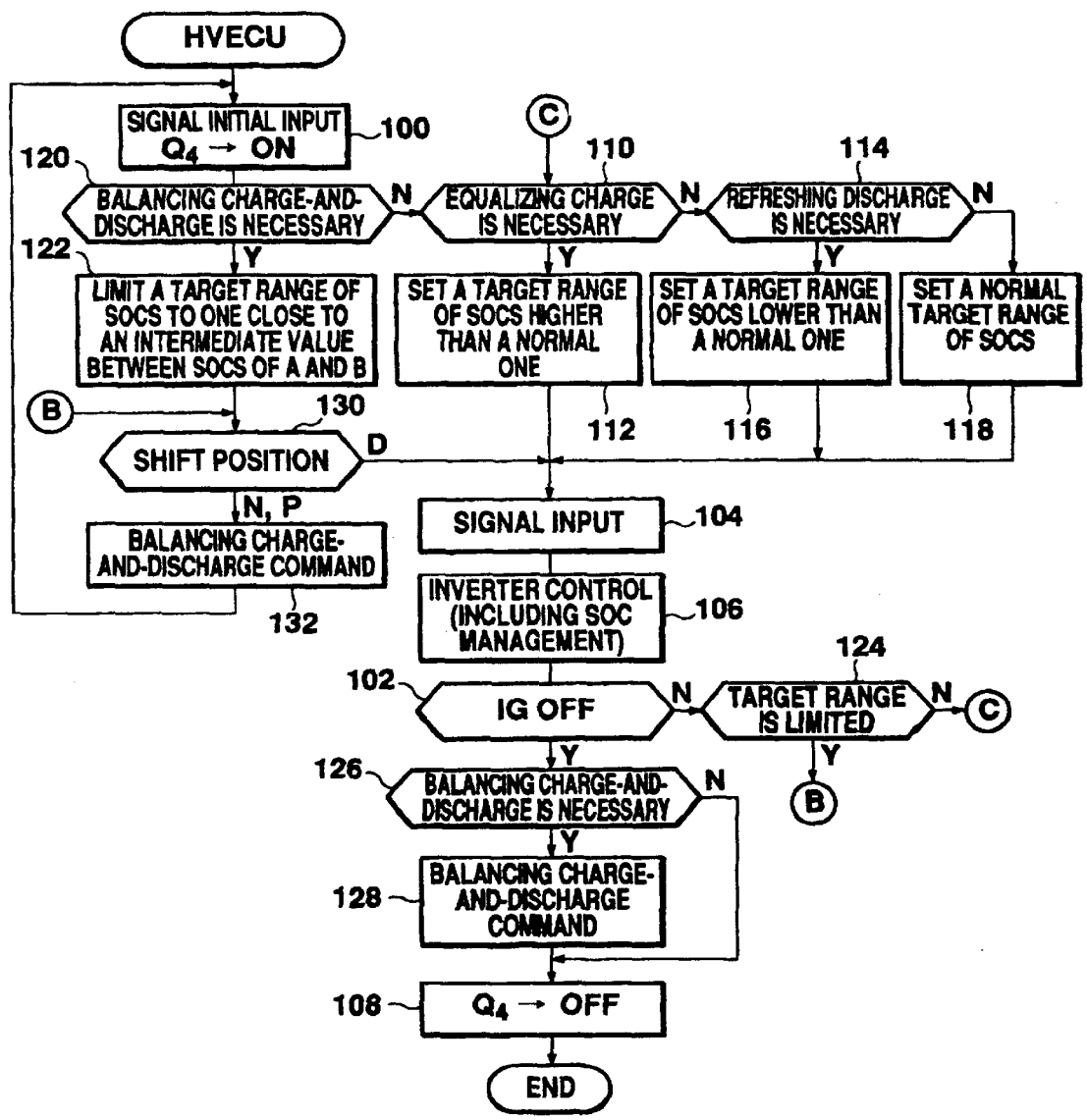
FIG. 10 is a flowchart showing the operation sequence of an HVECU.

In order to put the above principle into practice, the HVECU 26 and the battery ECU 32 perform steps shown in FIGS. 10–15. FIG. 10 shows operations of the HVECU 26, while the other figures show those of the battery ECU 32.

Figure 11:
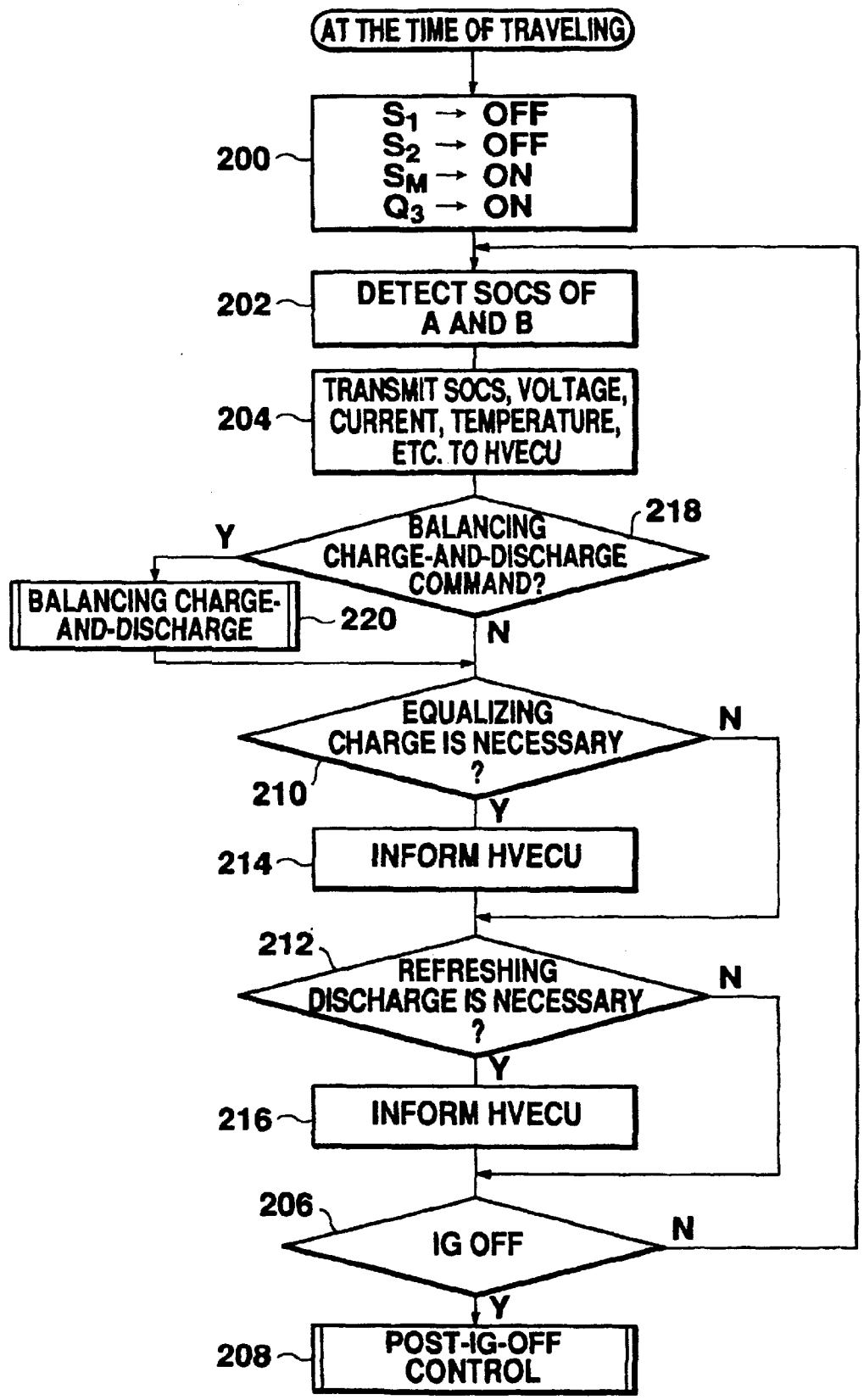
FIG. 11 is a flowchart showing the control sequence of the battery ECU at the time of traveling.

First, when the IG is turned on by a driver, the HVECU 26 and the battery ECU 32 begin operation. Then, as a first step, the battery ECU 32 turns off the contactors S1, S2 and turns on the contactor SM and the transistor Q3 (FIG. 11: 200). After this step is performed, there arises the circuit state in which the whole of the battery blocks A and B connected in series is inserted between the direct-current terminals of the inverters 22, 24 and the bidirectional boosting converter 44 is disconnected from both of the battery blocks A and B. The battery ECU 32 examines SOCs of the battery blocks A and B based on a detected electric current etc. (202) and transmits them, together with other information, to the HVECU 26 (204). The HVECU 26 receives signals from the battery ECU 32 and turns on the transistor Q4 (FIG. 10: 100).

After this initial signal input steps, the HVECU 26 and the battery ECU 32 starts the repetitive operation of transmitting signals of SOCs etc. which are detected by and transmitted from the battery ECU 32 to the HVECU 26 (FIG. 11: 204, FIG. 10: 104) and inverter control based on the received signals by the HVECU 26 including the management of SOCs with a target range (FIG. 10: 106). Except under exceptional circumstances, these steps are repeated until the IG is turned off (FIG. 10: 102, FIG. 11: 206). When the IG is turned off, the HVECU 26 turns off the transistor Q4 to disconnect a power source which has been held through the contactor S4 and terminates its operation (108), and the battery ECU 32 shifts to post-IG-off control (208). In the post-IG-off control shown in FIG. 12, the battery ECU 32 turns off the contactor SM to shut off the battery circuit 12 from the inverters 22, 24 (300), turns off the transistor Q3 to disconnect a power source which has been held through the contactor S3, and terminates its operation (302).

While the IG is on, the battery ECU 32 not only performs SOC detection and communication with the HVECU 26, as stated above, but also makes a decision whether or not an equalizing charge is necessary (FIG. 11: 210) and a decision whether or not a refreshing discharge is necessary (212). When elapsed time after the last equalizing charge or refreshing discharge or unbalance of the current voltages or SOCs between the battery blocks exceeds a predetermined value, the battery ECU 32 makes a decision that an equalizing charge or a refreshing discharge is necessary and informs the HVECU 26 of it (214, 216). When the HVECU 26 is informed that an equalizing charge is necessary (FIG. 10: 110), it changes a target range of SOCs to a greater value, as stated above (112); when the HVECU 26 is informed that a refreshing discharge is necessary (114), it changes a target range of SOCs to a smaller value (116). Through these operations, SOCs of the batteries in the battery circuit 12 shift to a higher or lower level appropriate to equalizing charge or refreshing discharge. When the HVECU 26 has received no such information, it manages SOCs, in principle, according to a normal target range (118).

Figure 12:
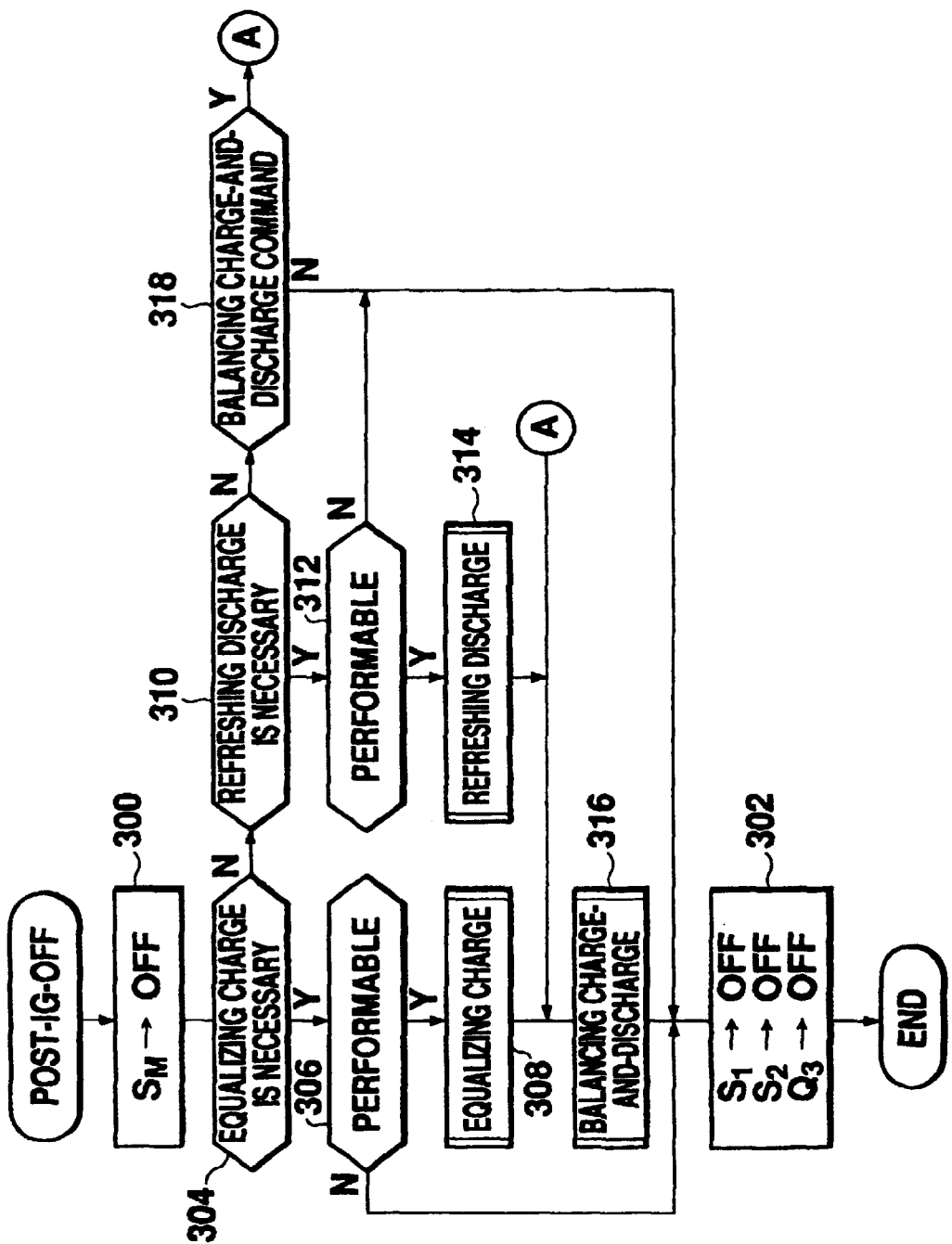
FIG. 12 is a flowchart showing the control sequence of the battery ECU after an IG is turned off.

Furthermore, when the IG is turned off, the battery ECU 32 performs an equalizing charge or a refreshing discharge after step 300. That is, as shown in FIG. 12, when an equalizing charge is necessary (304) and an SOC is sufficiently high to complete the charge in a short time (306), the battery ECU 32 performs the operation (308). Similarly, when a refreshing discharge is necessary (310) and an SOC is sufficiently low to complete the discharge in a short time (312), the battery ECU 32 performs this operation (314). After the equalizing charge or the refreshing discharge is performed, the battery ECU 32 performs balancing charge-and-discharge (316) and then proceeds to step 302. At step 302, with or before the above cancellation of self-hold of a power source, the contactors S1, S2 are turned off, resulting in the disconnection of the bidirectional boosting converter 44 from the battery blocks A and B.

Figure 14:
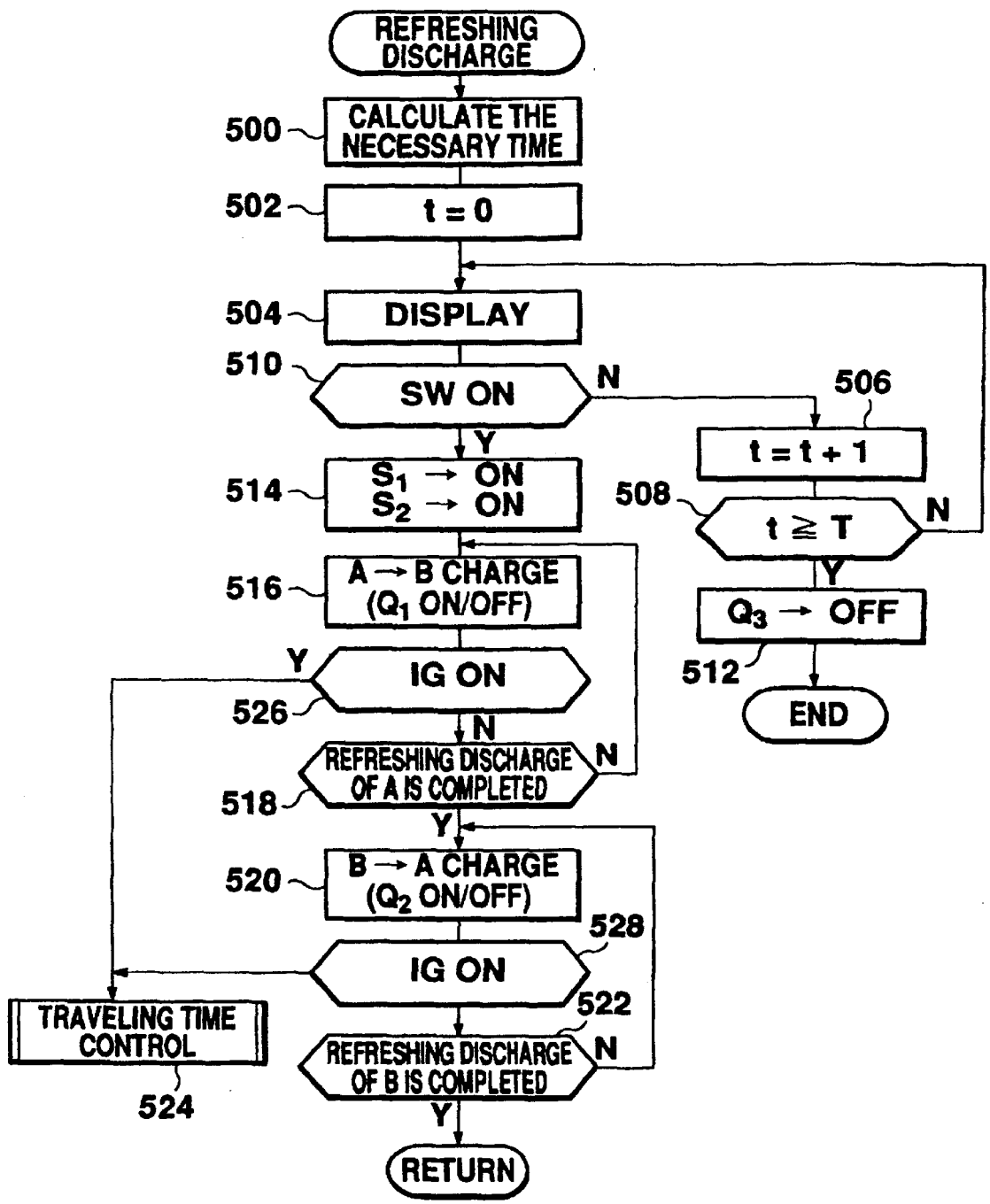
FIG. 14 is a flowchart showing the control sequence of the battery ECU on refreshing discharge.

When the battery ECU 32 performs an equalizing charge, it calculates the time necessary to perform this equalizing charge based on data such as the current SOCs of the battery blocks A and B, a target SOC value when performing the equalizing charge, the amount of a charging and discharging electric current per unit time through the bidirectional boosting converter 44, etc. (FIG. 14: 400). The battery ECU 32 then resets a value of an internal counter t to 0 (402), causes the equalizing charge display part 38 on the display unit 36 to light, and causes the time display part 42 to display the necessary time calculated at step 402 (404). The battery ECU 32 sequentially increments a value of the counter t (406), and turns off the transistor Q3 to disconnect a power source therefrom (412) when the switch SW is not turned on (410) before the contents of the counter t come to a predetermined value of T (408).

When the switch SW is turned on before the contents of the counter t come to a value of T, the battery ECU 32 turns on the contactors S1, S2 to connect the battery blocks A and B to the bidirectional boosting converter 44, and then turns on the contactor S5 and turns off the contactor S6 to define boosting direction (414). Then the battery ECU 32 provides periodic on/off signals to the transistor Q1 to cause the bidirectional boosting converter 44 to perform the boosting operation of a terminal voltage of the battery block A and applying boosted voltage to the terminals of the battery block B, namely, the operation of charging the battery block B with the output of the battery block A (416). When an equalizing charge of the battery block B is completed (for example, when an SOC of the battery block B exceeds 110%) (418), the battery ECU 32 conversely turns off the contactor S5, turns on the contactor S6, and then periodically turns on/off the transistor Q2 in order to cause the bidirectional boosting converter 44 to perform the operation of boosting a terminal voltage of the battery block B and applying boosted voltage to the terminals of the battery block A, namely, the operation of charging the battery block A by output of the battery block B (420). When an equalizing charge of the battery block A is also completed (422), the battery ECU 32 completes control on equalizing charge and proceeds to the above step 316.

With refreshing discharge (FIG. 2; 314), the battery ECU 32 performs steps 500–522 which are almost the same as steps 400–422 for equalizing charge (FIG. 14), except that the necessary time calculated at step 500 is not for an equalizing charge, but for a refreshing-discharge, and that at step 504, the refreshing discharge display part 40 lights and not the equalizing charge display part 38. At each step of 518 and 520, moreover, a decision is made whether a refreshing discharge of the battery block A or B is completed or not, namely, whether an SOC of the battery block is substantially 0%.

Figure 13:
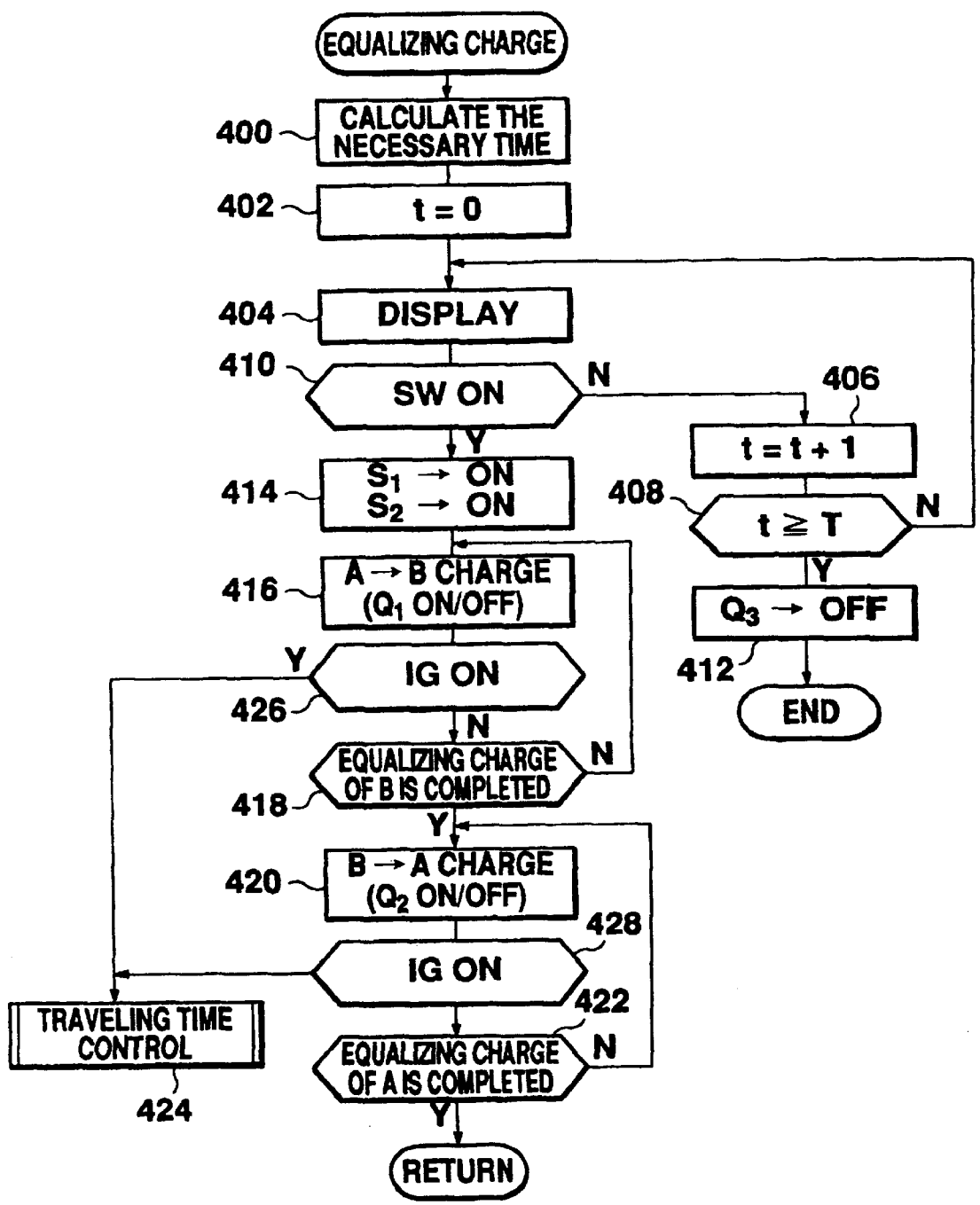
FIG. 13 is a flowchart showing the control sequence of the battery ECU on equalizing charge.
Figure 15:
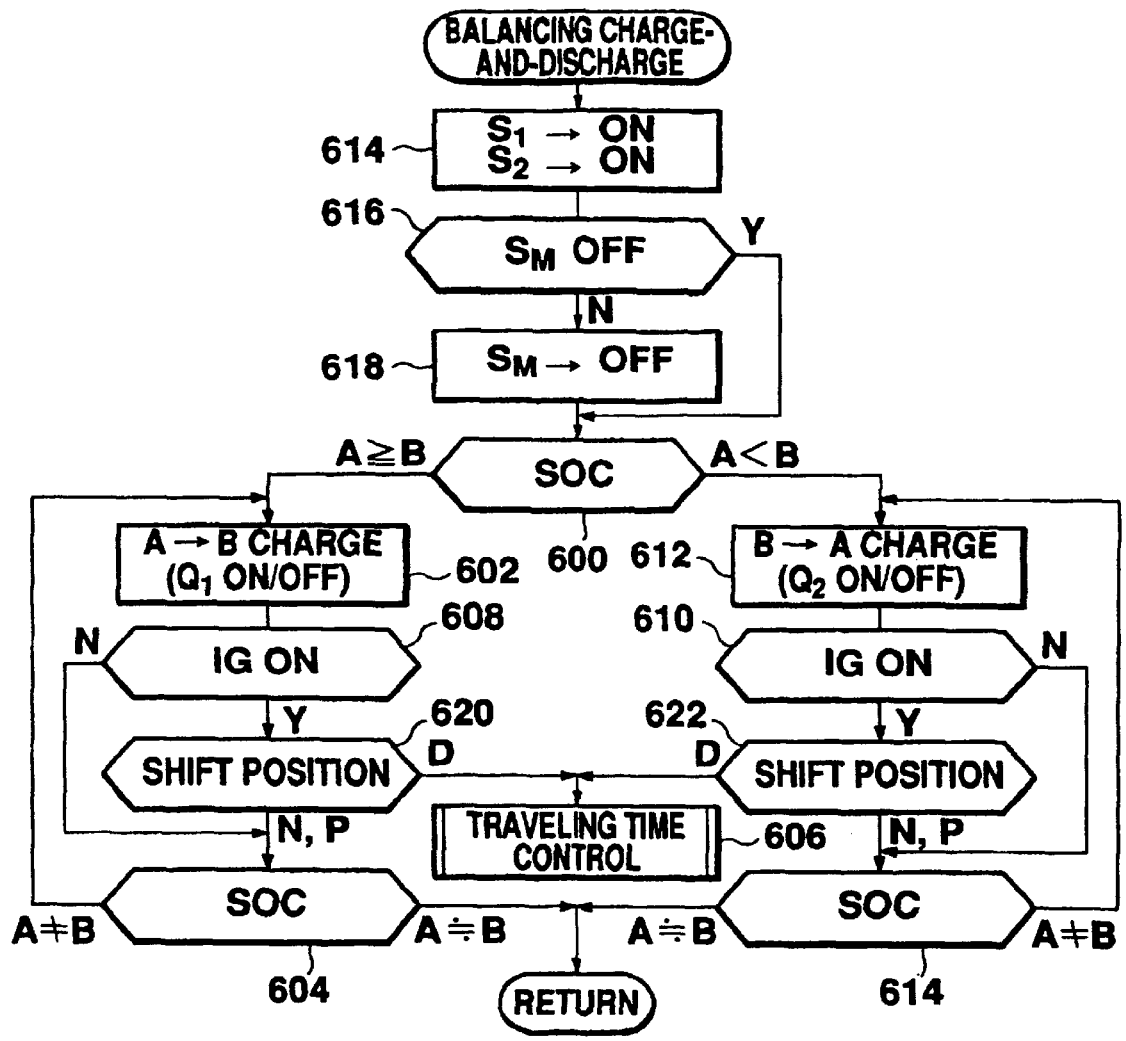
FIG. 15 is a flowchart showing the control sequence of the battery ECU on balancing charge-and-discharge.

After an equalizing charge or a refreshing discharge is completed, the battery ECU 32 proceeds to a step of balancing charge-and-discharge (316), as shown in FIG. 12. Before balancing charge-and-discharge is performed, the battery ECU 32 makes a decision whether an SOC of the battery block A is equal to or greater than that of the battery block B (FIG. 15: 600). If the steps shown in FIGS. 13 and 14 are normally completed, the operation of the battery ECU 32 proceeds from step 600 to step 602 because the relation of $A \geq B$ between SOCs of both battery blocks exists at the time of proceeding to step 316. At step 602, in order to cause the bidirectional boosting converter 44 to perform the operation by boosted voltage of the battery block A and applying it to the terminals of the battery block B, the battery ECU 32 turns on the contactor S5, turns off the contactor S6, and then generates signals to periodically turn on/off the transistor Q1. The battery ECU 32 continues to perform this operation until a significant difference of SOCs between the battery blocks A and B disappears (604). When the significant difference disappears, the operation of the battery ECU 32 proceeds to step 302 in FIG. 12.

A decision on whether an equalizing charge or a refreshing discharge is performable or not is made by a driver etc. through the display of the display unit 36 and the corresponding operation of the switch SW, as stated above. In reality, however, the IG can be turned on again before an equalizing charge, a refreshing discharge, or the following balancing charge-and-discharge are completed. Even if an equalizing charge, a refreshing discharge, or the following balancing charge-and-discharge are being performed, the operation of the battery ECU 32 proceeds to traveling control (FIG. 13: 424, FIG. 14: 524, FIG. 15: 606) shown is FIG. 11 when the IG is turned on (FIG. 13: 426, 428; FIG. 14: 526, 528; FIG. 15: 608, 610). In such a case, a vehicle usually starts with SOC unbalance between the battery blocks A and B (refer to FIG. 7) left. If this state lasts for a long time, the battery block in a high SOC is excessively charged and the other in a low SOC is excessively discharged, resulting in a shorter life of the battery circuit 12. In this embodiment, therefore, the HVECU 26 and the battery ECU 32 perform operations to avoid it.

First, after the HVECU 26 performs step 100 on signal initial input, it makes a decision, based on SOCs included in input signals, whether balancing charge-and-discharge is necessary or not, as shown in FIG. 10 (120). If balancing charge-and-discharge is not necessary, the HVECU 26 proceeds to the above step 110; conversely, if balancing charge-and-discharge is necessary as a result of an interruption of an equalizing charge action etc., a target range used for the management of SOCs is set to a relatively narrow range (refer to FIG. 8) including an intermediate value between SOCs of the battery blocks A and B (122). The battery ECU 32 perform the management of SOCs based on such a limited target range (104, 106) until the IG is turned off (102, 124). The HVECU 26 judges whether a significant difference of SOCs between the battery blocks A and B may be considered to have disappeared as a result of the management. (120), on the basis of SOCs input from the battery ECU 32 (104). If judged as disappeared, the HVECU 26 stops limiting a target range by the step 122. That is, unless there is a need for an equalizing charge or a refreshing discharge, a target range of SOCs returns to a normal value (118).

When, in spite of a target range being limited at step 122, unbalance of SOCs between the battery blocks A and B is not eliminated before the IG is turned off (126), the HVECU 26 issues a balancing charge-and-discharge command to the battery ECU 32 prior to performing step 108 (128). As shown in FIG. 12, if a balancing charge-and-discharge command is issued to the battery ECU 32 by the HVECU 26 (318), the battery ECU 32 performs balancing charge-and-discharge at step 316 except when there is a need for an equalizing charge or a refreshing discharge (thus when balancing charge-and-discharge are performed after step 308 or 314). In this embodiment, therefore, even if the unbalance that occurred while the IG was on is not significantly reduced or eliminated before the IG is turned off, balance is recoverable after the IG is turned off.

Furthermore, the HVECU 26 issues a similar balancing charge-and-discharge command to the battery ECU 32 (132) if the shift lever is operated to be in the neutral (N) or parking (P) position while a target range is limited at step 122 (130). As shown in FIG. 11, when a balancing charge-and-discharge command is issued to the battery ECU 32 by the HVECU 26 (218), the battery ECU 32 performs balancing charge-and-discharge in response to it (220). In this embodiment, as stated above, even if a shift position is N or P, balancing charge-and-discharge is performed. As a result, unbalance of SOCs between the battery blocks at the time of starting can be quickly eliminated.

At the point in time when balancing charge-and-discharge performed in response to a balancing charge-and-discharge command from the HVECU 26 begins, the relation of A<B between SOCs of both battery blocks may exist unlike balancing charge-and-discharge performed at step 316. As shown in FIG. 15, therefore, step 600 is performed to compare SOCs of the battery blocks and steps 612, 610, 614 corresponding to steps 602, 608, 604 respectively are performed if A<B. At step 612, charging from the battery block B to the battery block A is performed unlike step 602 where charging from the battery block A to the battery block B is performed. When balancing charge-and-discharge are performed in response to a balancing charge-and-discharge command from the HVECU 26, the contactors S1, S2 are off and the contactor SM is on. And so, at the beginning of a procedure shown in FIG. 15, the battery ECU 32 turns on the contactors S1, S2 (614) and turns off the contactor SM if it is on (616, 618). Furthermore, if balancing charge-and-discharge is performed in response to a balancing charge-and-discharge command issued at step 132, the IG is still on; therefore, the procedure shown in FIG. 15 proceeds to traveling time control provided that the IG is on and a shift position is a D (drive) range (620, 622).

(4) Supplement

In the above description, the present invention was expressed as one relating to "an electric motor vehicle," but the present invention can be also understood, for example, as one relating to an electric vehicle, a hybrid vehicle, and a control unit and method. This limitation of a subject or change of category can be easily derived from the disclosure in the present application by one of ordinary skill in the art. Furthermore, the present invention can be expressed as subcombinations of the above configuration, such as a battery circuit, an equalizing charge unit and method, a refreshing discharge unit and method, a balancing charge-and-discharge unit and method, an SOC managing unit and method, and an equalizing charge/refreshing discharge necessary time display unit and method. This extraction of features can be also uniquely made from the disclosure in the present application by the ordinary skilled person in the art.

In the embodiment section a description was given with a series hybrid vehicle as an example. However, except for improvements assuming an electric power source in a vehicle other than a battery, the present invention can also be applied to a pure EV. In the embodiment section, moreover, a description was given with an engine-driven-generator, namely, a generator driven by mechanical output of an engine as the "electric power source in a vehicle other than a battery." However, other electric power sources, such as a solar cell or a fuel cell, may be used in place of the engine-drive-generator. In order to achieve the improvements about SOC management in the present application, a variable output electric power source having the capability to control its output is preferably used as the "electric power source in a vehicle other than a battery." Furthermore, a vehicle in which mechanical output of an engine and that of a motor can be appended in parallel to driving wheels has essentially the same part as a pure EV, and so the present invention can be applied thereto. Especially, the improvements assuming the electric power source in a vehicle other than a battery in the present application can be also introduced in a vehicle in which a motor can be used as an engine-driven-generator, such as a parallel hybrid vehicle having a motor on the axis of an engine.

In the above embodiments, an HVECU and a battery ECU were used as control devices, various control procedures relating to the features of the present invention were divided among them, and part of the control procedures relating to the features of the present invention were achieved through communication between both ECUs. However, the present invention can take other forms, such as one in which a single ECU performs all the control procedures and thus there is no need for communication between ECUs or one in which a three or more ECUs perform the control procedures through the communication. Again, with a monodirectional boosting converter instead of a bidirectional boosting converter, connection to battery blocks may be switched according to a change in the charging or discharging direction. In addition, a change in the number of battery blocks and corresponding changes in circuit and control procedure are obvious to a person of ordinary skill in the art makers concerned. And in the embodiment section, some components, such as a speed increasing mechanism between an engine and a motor-generator, are omitted especially in order to achieve readability because they can be understood by a person of ordinary skill in the art without a drawing.

What is claimed is:

1. An electric motor vehicle comprising:
    a battery block set including battery blocks connectable in series and each having an electromotive force, each battery block having more than one battery cell connected in series;
    a vehicle propelling motor-generator configured to supply electric power to, and receive electric power from, the battery block set;
    means for determining whether a predetermined executing condition of at least one of an equalizing charge operation and a refresh discharge operation is met concerning said battery block set; and
    means for performing, in order to achieve a predetermined equalized state of charge between the more than one battery cell in each battery block, the at least one of the equalizing charge operation and the refresh discharge operation for each battery block by sequentially performing a forced charge transfer operation from one battery block to another battery block for each of said battery blocks, when the predetermined executing condition is met and there is no need to supply or receive electric power between said battery blocks and said vehicle propelling motor-generator.

2. An electric motor vehicle according to claim 1, further comprising:
    means for eliminating a significant difference of states of charge between said battery blocks by sequentially performing the forced charge transfer from one battery block to another battery block for each of the battery blocks after the at least one of the equalizing charge operation and the refresh discharge operation is performed for every battery block is completed.

3. An electric motor vehicle according to claim 1, further comprising:
    means for eliminating a significant difference of states of charge between said battery blocks which appears during traveling by sequentially performing the forced charge transfer from one battery block to another battery block for each of said battery blocks when a need arises for supplying or receiving electric power between said battery blocks and said vehicle propelling motor-generator is-removed or when there occurs a change for a temporary stoppage of supplying or receiving electric power between said battery blocks and said vehicle propelling motor-generator.

4. An electric motor vehicle according to claim 1, further comprising:
    means for notifying a driver, prior to an execution of the at least one of the equalizing charge operation and the refresh discharge operation, of a time necessary for said execution, so as to obtain permission therefor; and
    means for performing the at least one equalizing charge operation and the refresh discharge operation if permission is obtained, and for prohibiting the at least one of a equalizing charge operation and the refresh discharge operation if permission is not obtained.

5. An electric motor vehicle according to claim 1, further having:
    a variable output electric power source for providing electric power at an output thereof to said battery block set when the respective battery blocks are connected to each other in series;
    means for controlling the output of said variable output electric power source so that states of charge of the battery blocks connected to each other in series are always within a target range, when a need arises to supply or receive electric power between the battery blocks and the vehicle propelling motor-generator; and
    means for setting said target range close to the predetermined equalized state of charge when the output of said variable output electric power source being controlled and the predetermined executing condition being met.

6. An electric motor vehicle according to claim 1, further comprising:
    a variable output electric power source for providing electric power at an output thereof to the battery blocks, the battery blocks being connected in series;
    means for controlling output of said variable output electric power source so that a state of charge of battery blocks connected in series is always within a target range when a need arises to exchange electric power between the battery blocks and the vehicle propelling motor-generator; and
    means for setting said target range when there is a significant difference in states of charge between said battery blocks so that the target range occupies a minute range which includes an average state of charge of said battery blocks.

7. A battery system comprising:
    a battery block set including battery blocks connectable in series and each having an electromotive force, each battery block having more than one battery cell connected in series;
    a vehicle propelling motor-generator configured to supply electric power to and receive electric power from the battery block set;
    means for determining whether a predetermined executing condition of at least one of an equalizing charge operation and a refreshing discharge operation is met concerning said battery block set; and
    means for performing, in order to achieve a predetermined refreshed state of charge between the more than one battery cell in each battery block, the at least one of an equalizing charge operation and the refreshing discharge operation for each battery block by sequentially performing a forced charge transfer operation from one battery block to another battery block for each of said battery blocks, when the predetermined executing condition is met and there being no need to supply or receive electric power between said one battery block and the another battery block and said vehicle propelling motor generator.

8. A battery system according to claim 7, further comprising:

means for eliminating a significant difference of states of charge between said battery blocks by sequentially performing the forced charge transfer from one battery block to another battery block for each of the battery blocks after the at least one of an equalizing charge operation and the refreshing discharge operation for every battery block is completed.

9. A battery system according to claim 7, further comprising:

means for eliminating a significant difference of states of charge between said battery blocks when traveling by sequentially performing forced charge transfers from battery block to battery block for each of said battery blocks when a need arises for giving and receiving electric power between said battery blocks and said vehicle propelling motor-generator is removed or when there occurs room for a temporary stoppage of giving and receiving of electric power between said battery blocks and said vehicle propelling motor-generator.

10. A battery system according to claim 7, further comprising:

means for notifying a driver of an electric motor vehicle, prior to an execution of the at least one of the equalizing charge operation and the refreshing discharge operation, of a time necessary for said execution, so as to obtain permission therefor; and means for performing the at least one of the equalizing charge operation and the refreshing discharge operation if permission is obtained, and for prohibiting the at least one of the equalizing charge operation and the refreshing discharge operation if permission is not obtained.

11. A battery system according to claim 7, further comprising:

a variable output electric power source for providing electric power at an output thereof to said battery block set when the respective battery blocks are connected in series;

means for controlling the output of said variable output electric power source so that states of charge of the battery blocks connected to each other in series are always within a target range when there exists a need to supply and receive electric power between the battery blocks and the vehicle propelling motor-generator; and means for setting said target range close to the predetermined refreshed state of charge, when the output of said variable output electric power source is controlled and the predetermined executing condition is met.

12. A battery system according to claim 7, further comprising:

a variable output electric power source for providing electric power at an output thereof to said battery blocks connected in series;

means for controlling output of said variable output electric power source so that a state of charge of said battery blocks connected in series is always within a target range when a need arises to exchange electric power between the battery blocks and the vehicle propelling motor-generator; and means for setting said target range when there exists a significant difference in states of charge between said battery blocks so that the target range occupies a minute range which includes an average state of charge of said battery blocks.

13. An electric motor vehicle comprising:

a battery block set including battery blocks connectable in series and each having an electromotive force, each battery block having more than one battery cell connected in series;

a vehicle propelling motor-generator configured to supply electric power to, and receive electric power from, the battery block set; and an electronic control unit configured to determine whether a predetermined executing condition of at least one of an equalizing charge operation and a refresh operation is met concerning said battery block set, said electronic control unit being configured to control the at least one of an equalizing charge operation and a refresh operation by sequentially performing a forced charge transfer operation from one battery block to another battery block for each of said battery blocks, when the electronic control unit determines that the predetermined executing condition is met and there is no need to supply or receive electric power between said battery blocks and said vehicle propelling motor-generator, said forced charge transfer operation achieving a predetermined equalized state of charge between the more than one battery cell in each battery block.

14. An electric motor vehicle according to claim 13, wherein:

said electronic control unit being configured to eliminate a significant difference of states of charge between said battery blocks by sequentially performing the forced charge transfer from one battery block to another battery block for each of the battery blocks after controlling the at least one of an equalizing charge operation and the refreshing discharge operation for every battery block.

15. An electric motor vehicle according to claim 13, wherein:

said electronic control unit being configured to eliminate the significant difference of states of charge between said battery blocks when traveling by sequentially performing forced charge transfers from battery block to battery block for each of said battery blocks when a need arises for giving and receiving electric power between said battery blocks and said vehicle propelling motor-generator is removed or when there occurs room for a temporary stoppage of giving and receiving of electric power between said battery blocks and said vehicle propelling motor-generator.

16. An electric motor vehicle according to claim 13, wherein:

said electronic control unit being configured to notify a driver, prior to an execution of the at least one of the equalizing charge operation and the refreshing discharge operation, of a time necessary for said execution, so as to obtain permission therefor; and said electronic control unit being configured to perform the at least one of an equalizing charge operation and the refreshing discharge operation if permission is obtained, and for prohibiting the at least one of the equalizing charge operation and the refreshing discharge operation if permission is not obtained.

17. An electric motor vehicle according to claim 13, further comprising:

a variable output electric power source configured to provide electric power at an output thereof to said battery block set when the respective battery blocks are connected in series, wherein said electronic control unit being configured to control the output of said variable output electric power source so that states of charge of the battery blocks connected to each other in series are always within a target range when there exists a need to supply and receive electric power between the battery blocks and the vehicle propelling motor-generator, and said electronic control unit being configured to set said target range close to the predetermined refreshed state of charge, when the output of said variable output electric power source is controlled and the predetermined executing condition is met.

18. An electric motor vehicle according to claim 13, further comprising:

a variable output electric power source configured to provide electric power at an output thereof to said battery blocks connected in series, wherein said electronic control unit being configured to control said variable output electric power source so that a state of charge of said battery blocks connected in series is always within a target range when a need arises to exchange electric power between the battery blocks and the vehicle propelling motor-generator, and said electronic control unit being configured to set said target range when there exists a significant difference in states of charge between said battery blocks so that the target range occupies a minute range which includes an average state of charge of said battery blocks.

* * * * *